(12) United States Patent
Fowler et al.

(10) Patent No.: US 6,504,819 B2
(45) Date of Patent: *Jan. 7, 2003

(54) CLASSES OF SERVICE IN AN MPOA NETWORK

(75) Inventors: David G. Fowler, Ottawa (CA); Richard A. Chan, Kanata (CA); David Watkinson, Kanata (CA)

(73) Assignee: Alcatel Canada Inc., Kanata (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,087

(22) Filed: Sep. 25, 1998

(65) Prior Publication Data

US 2002/0097675 A1 Jul. 25, 2002

(30) Foreign Application Priority Data

Oct. 3, 1997 (CA) ............................................... 2217275
Jun. 30, 1998 (CA) ............................................... 2242219

(51) Int. Cl.⁷ ......................... G01R 31/08; G06F 11/00; H04L 1/00; H04L 12/26; H04L 12/54; H04J 1/16; H04J 3/14

(52) U.S. Cl. .............. 370/230; 370/395.51; 370/395.42
(58) Field of Search .................................. 370/229–236, 370/389–390, 395–401, 412–418, 395.1

(56) References Cited

U.S. PATENT DOCUMENTS

| | | | | | |
|---|---|---|---|---|---|
| 5,526,344 | A | * | 6/1996 | Diaz et al. | 370/364 |
| 5,537,400 | A | * | 7/1996 | Diaz et al. | 370/412 |
| 5,684,800 | A | * | 11/1997 | Dobbins et al. | 370/401 |
| 5,768,271 | A | * | 6/1998 | Seid et al. | 370/389 |
| 5,828,653 | A | * | 10/1998 | Goss | 370/230 |
| 5,862,338 | A | * | 1/1999 | Walker et al. | 709/224 |
| 5,953,338 | A | * | 9/1999 | Ma et al. | 370/395 |

* cited by examiner

Primary Examiner—Kwang Bin Yao
Assistant Examiner—Kevin C. Harper
(74) Attorney, Agent, or Firm—Marks & Clerk

(57) ABSTRACT

A Multi-Protocol Over ATM (MPOA) network being scalable so as to allow service providers to provide internetworking services to subscribers. The MPOA network is divided into virtual private networks to provide intranet and Internet services over an ATM backbone. The internetworking management system is able to assign differentiated classes of service to the virtual private networks. This permits a service provider to offer subscribers the options of different levels of service.

19 Claims, 11 Drawing Sheets

CLASSES OF SERVICE IN AN MPOA NETWORK

FIELD OF THE INVENTION

This invention relates to Multi-Protocol Over ATM (MPOA) networks and more particularly to a method and system for providing differentiated classes of service (CoS) to users of such networks.

BACKGROUND

MPOA provides a solution whereby multiple local area network (LAN) protocols can be routed and/or bridged across an asynchronous transfer mode (ATM) backbone network. The MPOA system works well in a small campus-like environment, where latency is often not an issue.

The MPOA solution is also being extended to carrier scale applications in order to provide internetworking services to multiple subscribers. This system, referred to herein as Carrier Scale Internetworking (CSI), introduces the concept of Realms which are instances of divided services through virtual networks (Vnet). Realms include virtual private networks (VPNs) and public Internet access. VPNs include both bridged and routed services.

In a carrier environment, more importance is placed on generating revenue from such a network. To facilitate increased revenue generation, the present invention allows a service provider to provide different classes of service (CoS) within a MPOA network. A better class of service is defined by reduced latency and reduced packet loss within the ATM network and within the LAN protocol forwarding devices.

SUMMARY OF THE INVENTION

In accordance with the present invention the CSI Classes of Service allow Wide Area Network (WAN) internetworking service providers to offer differentiated services to their customers. Service differentiation can be achieved at different levels, such as the Realm level or Vnet and Service Interface (SI) levels inside a particular Realm.

Therefore in accordance with a first aspect of the present invention there is provided in a Multi-Protocol Over ATM (MPOA) network a system for providing a user with differentiated classes of service, the system comprising: classification means to assign a class of service to respective packets of data; prioritizing means at a service point to the network to prioritize the packets according to the class of service; and traffic management means to support transport of the prioritized packets through the network.

In accordance with a second aspect of the invention there is provided a method of delivering differentiated service to users of a Multi-Protocol Over ATM (MPOA) network, the method comprising: assigning a class of service to respective data packets; prioritizing the packets according to the class of service; and transporting the packets through the network in accordance with the prioritization.

BRIEF DESCRIPTION OF THE DRAWINGS

The invention will now be described in greater detail with reference to the attached drawings wherein.

DETAILED DESCRIPTION OF THE INVENTION

Figure 1:
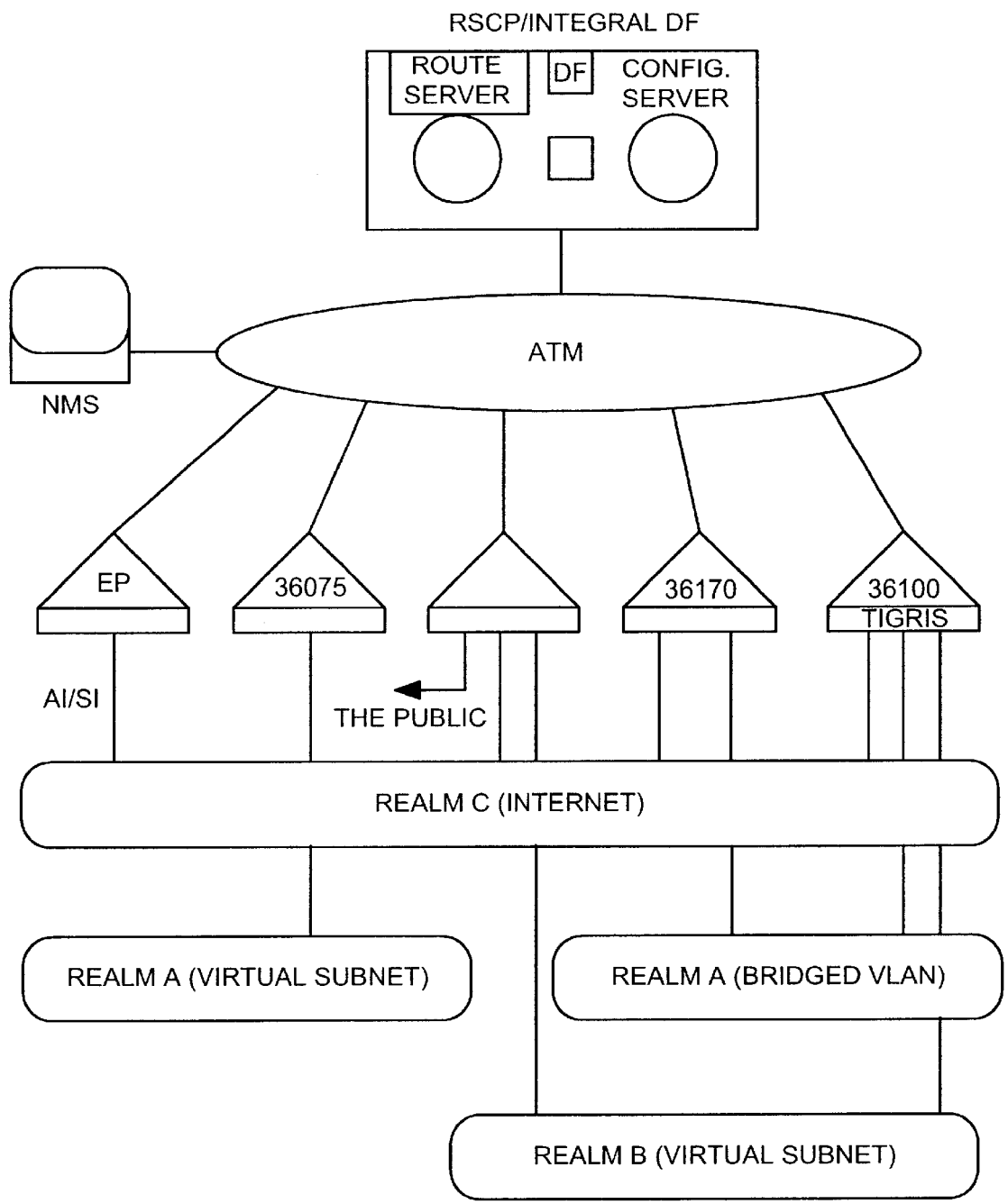
FIG. 1 is a high level architectural view of a Carrier Scale Internetworking (CSI) system.

FIG. 1 provides a high level architectural overview of elements which interact in a MPOA network to provide carrier scale internetworking services. As shown, an ATM backbone provides the vehicle for global-scale data transport between end users of the CSI system. The CSI system includes a network manager, and a route server control point RSCP which incorporates a Route Server (RS) and a configuration server (CONS). Access to the ATM backbone is via Service Points (SP) which include edge forwarders (EF), ridges and Internetworking Services Cards (ISC).

Figure 2:
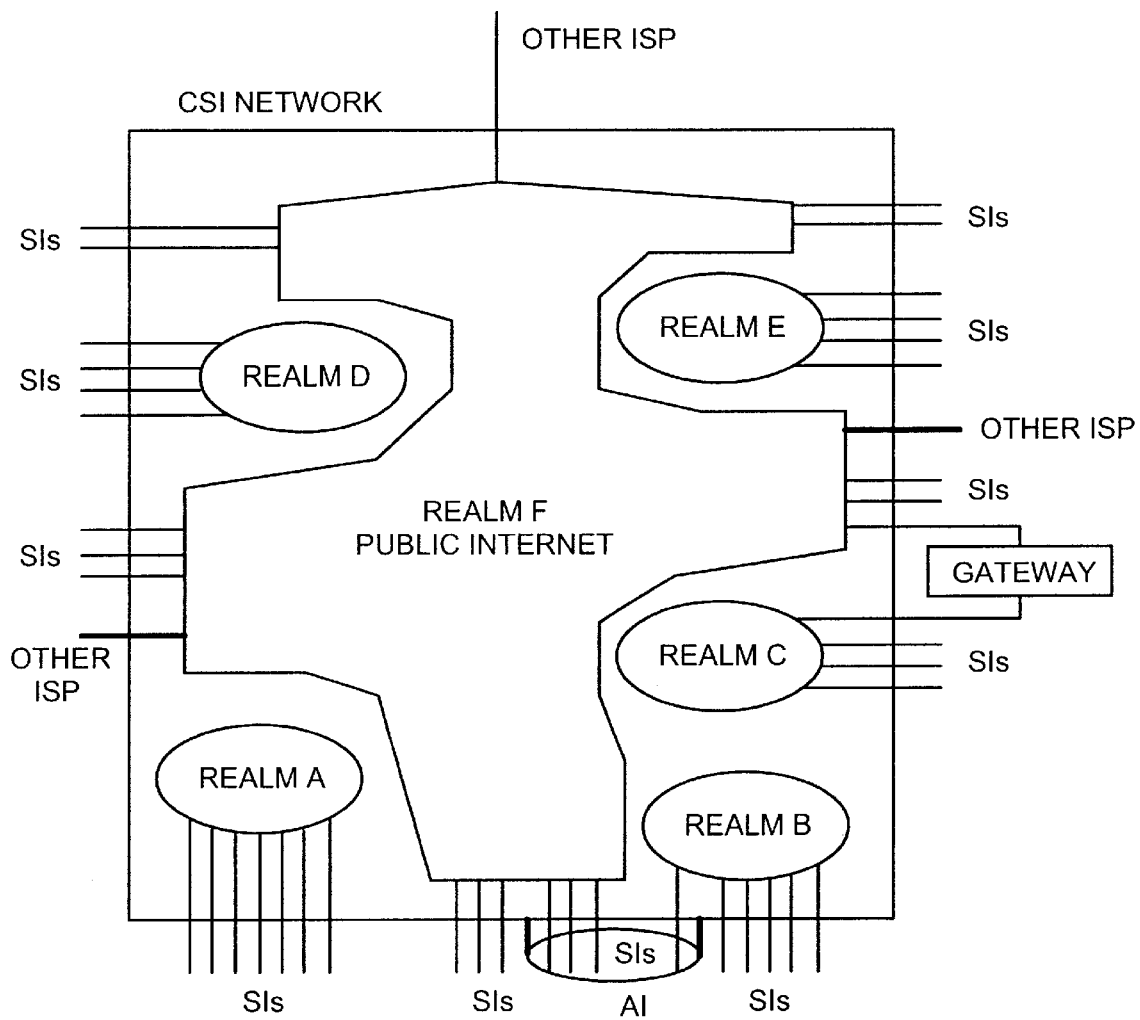
FIG. 2 is a service view of a CSI system.

The CSI system essentially divides the services provided by a Service Provider into virtual private networks (VPNs) including instances of intranet services and an Internet service known herein as Realms. These are shown in FIG. 1 and more clearly at a services view level in FIG. 2. A Realm may be owned by a user who can manage the services provided by the system.

Figure 3:
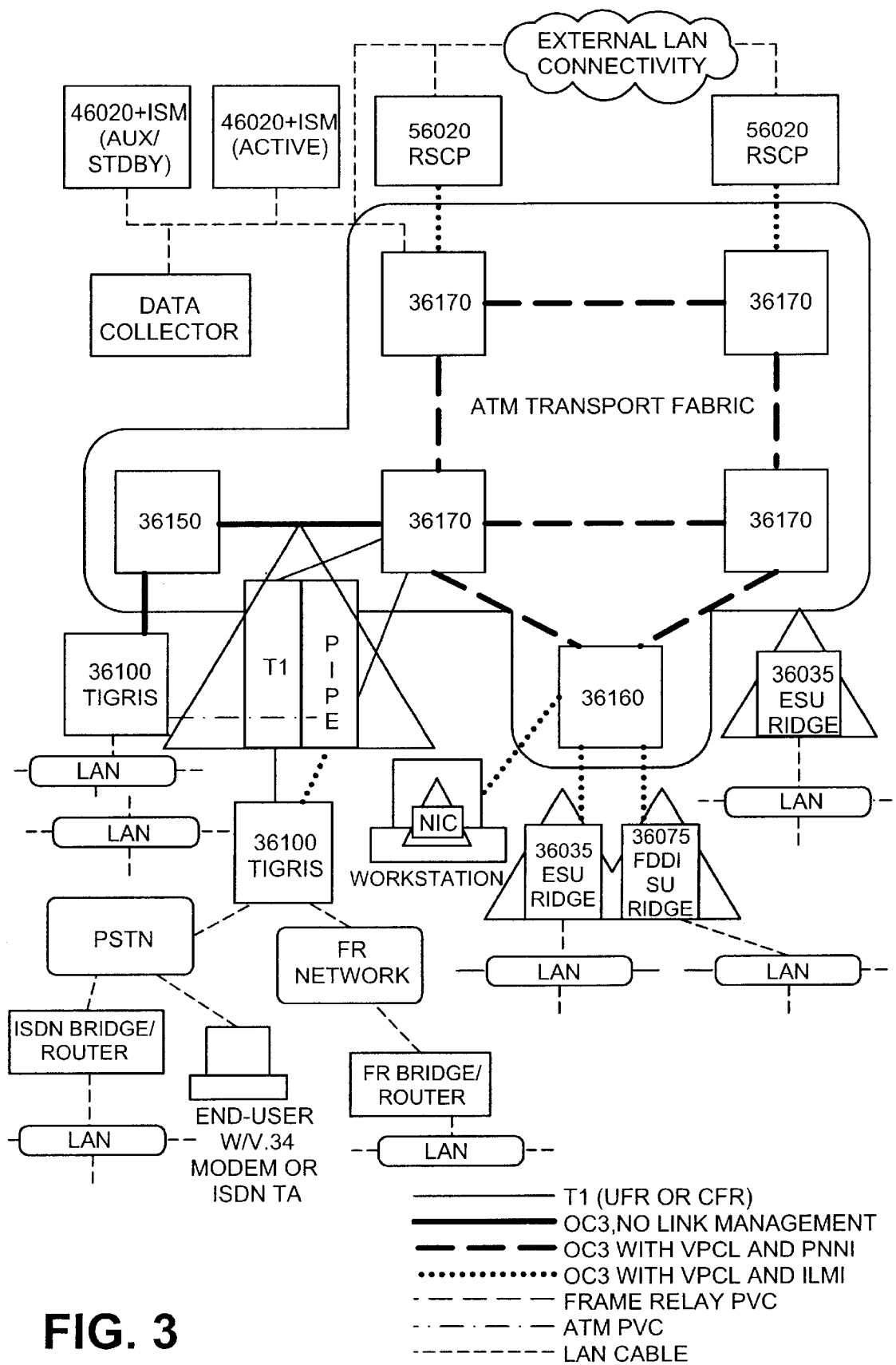
FIG. 3 is high level diagram of a typical CSI system with service differentiation capabilities.

FIG. 3 is a more detailed overview of a CSI system including the ATM transport fabric and switching nodes within the fabric. In addition to the system components shown in FIG. 1, FIG. 3 contains a representation of an Internetworking Services Manager (ISM) which is associated with the network management system (NMS). The ISM plays an important role in the assignment of class of service specifications to packets of data entering the ATM network.

In order to differentiate between traffic of different classes of service, the Edge Forwarder (e.g. Ridge, ISC) must be aware of the relative priority of various traffic streams. The traffic is currently specified in the Internetworking Services Manager by assigning a CoS value to a Virtual Network (Virtual Subnet or VLAN) and/or to specific Service Interfaces (SI) within that Virtual Network. This information is provided to the Edge Forwarder in addition to other information in the form of a message. The message is sent in response to specific inquiries.

The class of service for a particular service interface is the class of service assigned to it. If none has been assigned, then the class of service defaults to that of the VNet. The VNet CoS will be defaulted to a class designated "standard".

The class of service used by the Edge Forwarder is the better of the CoS of the source Service Interface and the CoS of the destination Service Interface. The resulting CoS is used by the Edge Forwarder to determine how to queue outgoing packets. Packets with a better CoS are queued separately from packets with worse CoS. Better CoS queues are serviced more frequently It is possible to determine Class of Service based on other factors. These factors include: source service interface; source address; destination address; type of service (ToS) bits in the packet; upper layer application; upper layer application source and destination port numbers.

In addition to the queuing control described above, the class of service of a particular packet is used to determine which shortcut switched virtual circuit (SVC) will be used when one is required. It is possible to have one SVC per class of service between any two Edge Forwarders at any time, depending on demand.

The user may specify ATM traffic parameters for each class of service. These traffic parameters are provided to the Edge Forwarder when it registers with the Configuration Server. When the Edge Forwarder determines that a new shortcut SVC is required, it will use the ATM traffic parameters specified for the Class of Service required for the particular packet being sent. It is expected that the user will configure more reliable traffic parameters for higher classes of service, thereby causing the delivery of packets for a higher class of service to be more reliable.

The Class of Service discussed above is used for user data only. Other types of traffic exist in the network and, in accordance with the invention automatically have higher priority than all user data. The types of traffic in this category are Routing Protocol packets (used to determine the reachability of other routers in the system), Spanning Tree Protocol packets (used to determine the reachability of other bridges in the system) and Control traffic (used to configure the Edge Forwarders.

The CSI system currently allows for multiple classes of service, with only a portion thereof being used for user data.

Figure 4:
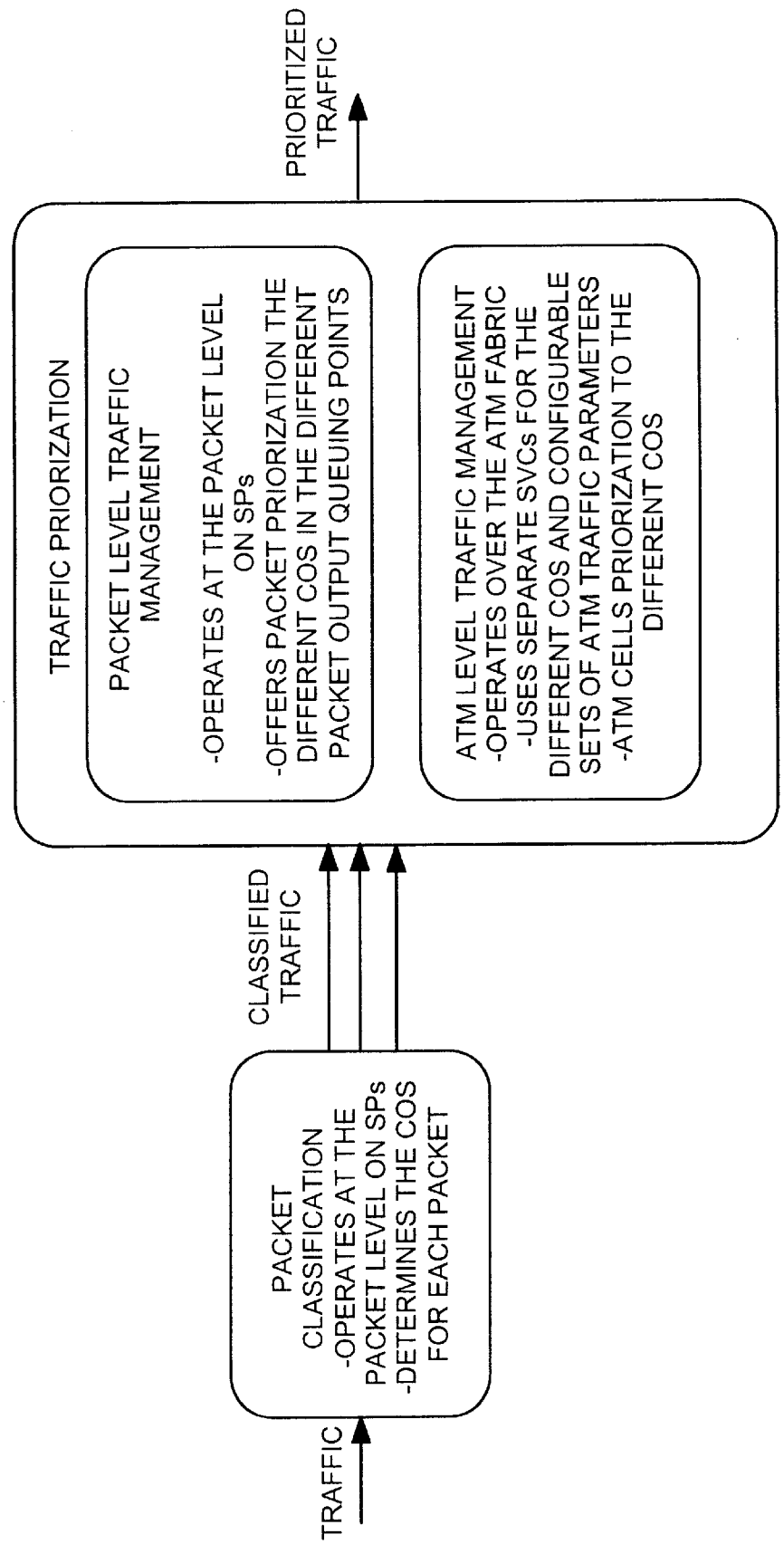
FIG. 4 a diagram of the class of service (CoS) functionality in a CSI system.

A particular implementation of the CSI Classes Of Service (CoS) feature offered by the present invention provides the following main functions: Packet Classification; Packet level Traffic Management; and ATM level Traffic Management. As shown in FIG. 4, the Packet Classification determines which CoS to offer to each packet, then the Packet Level Traffic Management and ATM Level Traffic Management functions ensures actual prioritization for each CoS.

The most user-visible application of the CoS in CSI system contemplated by the invention is the possibility for the Service Provider (SP) to offer differentiated service to its customers. This is achieved by the definition of Classes Of Service for User Data: In the following discussion two Classes of Service are identified namely, Standard CoS and Premium CoS. Premium CoS offers lower delays and lower packet loss rates than Standard CoS. The identification of two Classes of Service does not preclude the assignment of additional service classes to user data, or indeed control traffic as discussed subsequently.

The second application, more internal to the System but desirable for the reliability of the network, is to give priority to Control Traffic over User Data. This is achieved by the definition of a third Classes Of Service: High Priority Control Traffic CoS.

Figure 5:
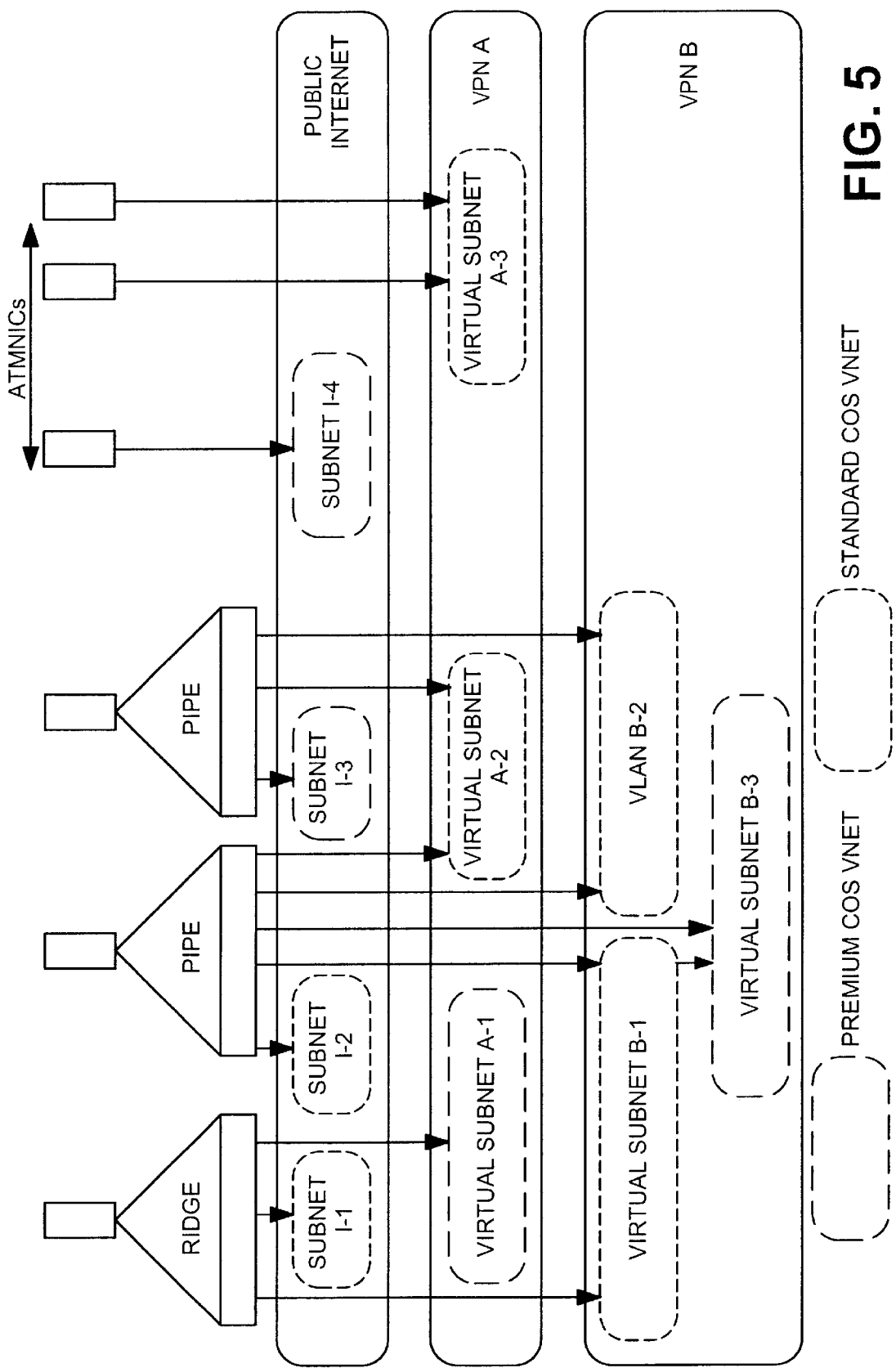
FIG. 5 illustrates an example of a CoS configuration at the virtual network (Vnet) level.

The User Data Packet Classification-Standard CoS or Premium CoS, is based on the CoS configuration defined by the ISM. A CoS can be configured at the VNet level, as shown in the example of FIG. 5. The general principle with such a configuration is that User Data Traffic gets the higher CoS configured on the source and destination VNet.

Figure 6:
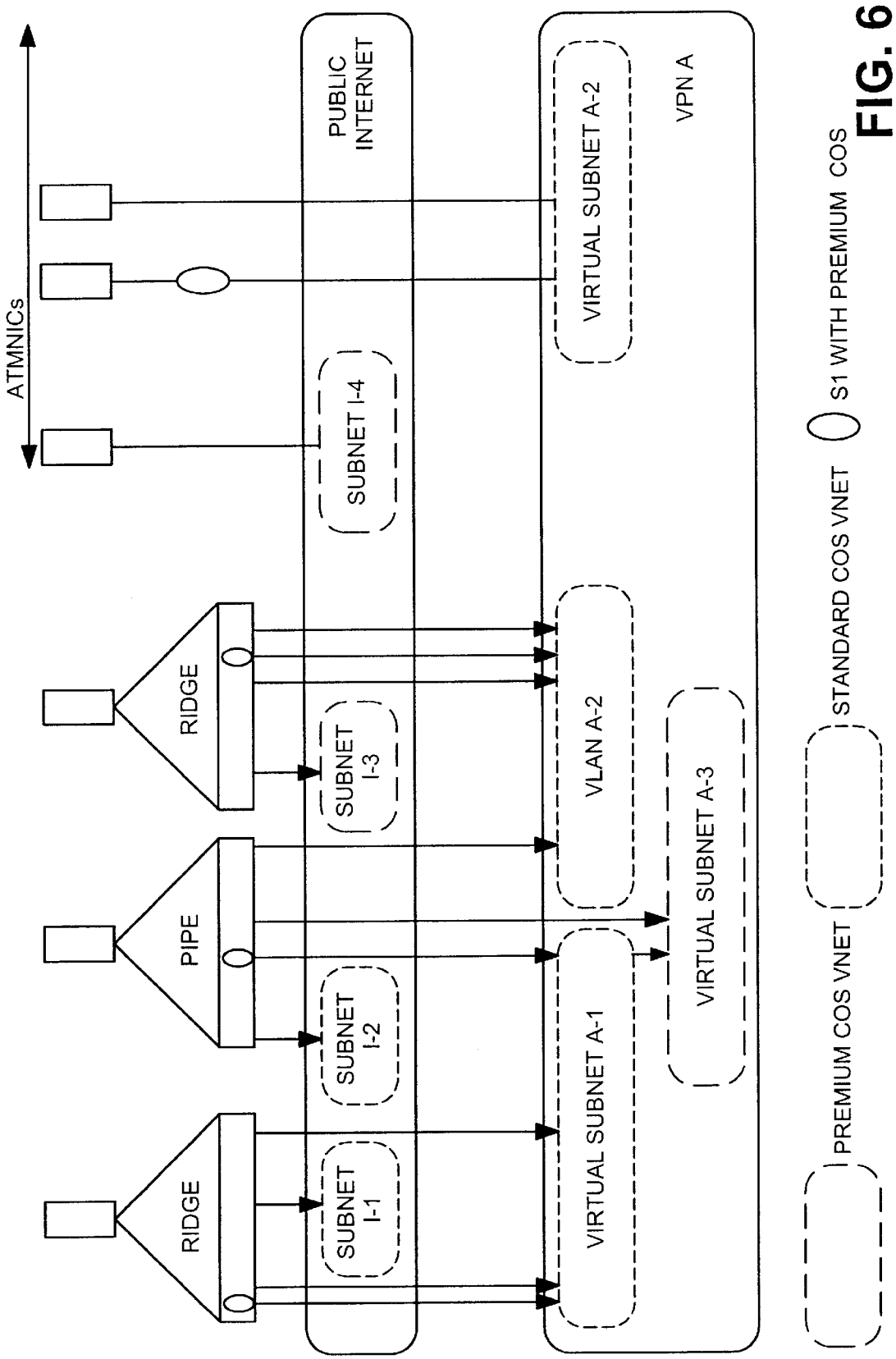
FIG. 6 illustrates a CoS configuration showing Premium CoS overriding the Vnet configuration.

The ISM also allows configuration of the CoS at the Service Interface (SI) level, as shown in FIG. 6. In this example, some SIs have been configured with a Premium CoS. The traffic received or sent to these Sis gets Premium CoS, regardless of the VNet CoS configuration. On the other SIs, the CoS classification is still based on the VNet configuration. Note that this applies to the ATM Hosts SIs as well as to the ISC (PIPE) or Ridge SIs. This can be used for example to give a special Premium CoS to a server in a Standard CoS VNet that is spread on multiple SIs.

Once the CoS on User Data traffic has been determined, a first level of effective service differentiation between Standard CoS and Premium CoS is achieved at the packet level by the use of separate packet transmission queues for each User Data CoS in the CSI components. This does not require specific user configuration.

Figure 7:
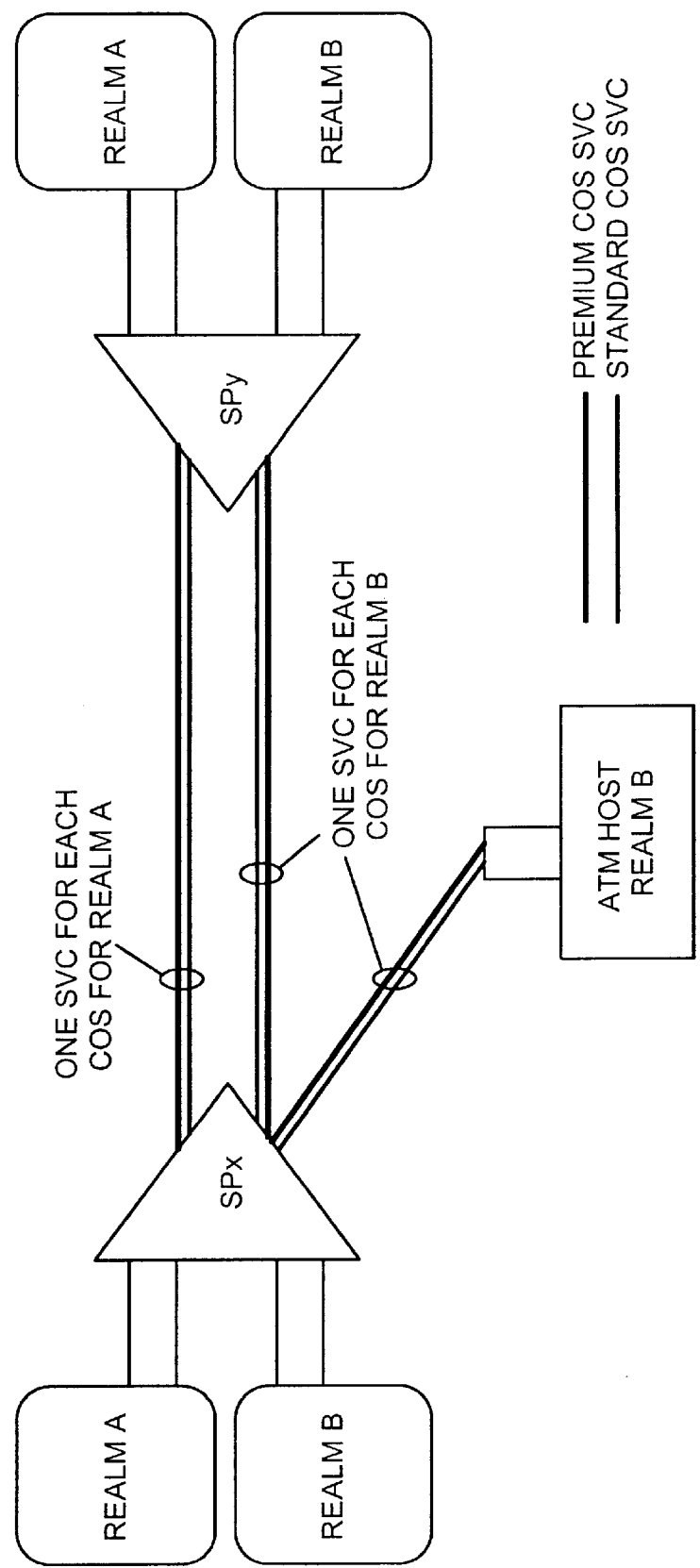
FIG. 7 illustrates a separate Service Point to Service Point (SP—SP) connection for each Realm and each CoS.

A second level of service differentiation is offered by the use of separate SP—SP connections and configurable sets of ATM Traffic Parameters for each Realm and each User Data CoS. This implies that a separate connection is used between two SPs for each Realm and each CoS, as shown in FIG. 7.

As discussed previously a general principle is that control traffic gets higher priority than User Data traffic, in order to provide immunity against data-plane congestion. Two levels of control traffic priority are defined: High Priority Control Traffic and Low Priority Control Traffic. The High Priority Control Traffic includes the Routing protocols, Spanning Tree Protocol, PPP Control Protocols and the CSI internal protocols for Configuration and Cache Management. A specific CoS: 'High Priority Control Traffic CoS' is defined for this type of traffic. The Low Priority Control Traffic includes ARP messages and CSI internal messages related to address resolution. However, no specific CoS is defined for Low Priority Control Traffic in as much as this type of traffic gets the same level of service as User Data Premium CoS. The Control Traffic prioritization does not require explicit user configuration either.

Figure 8:
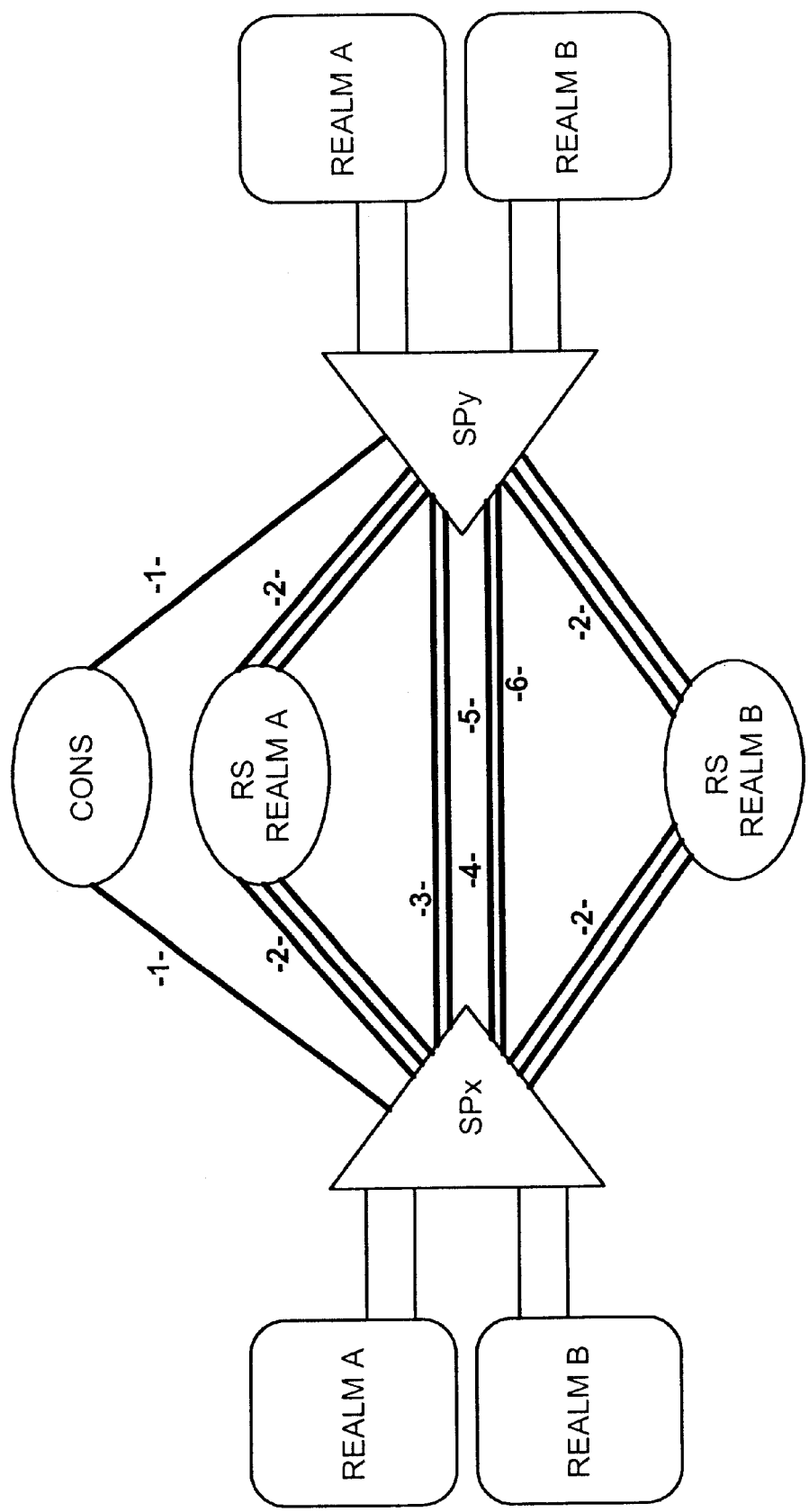
FIG. 8 shows a typical ATM traffic parameter configuration.

The Control Traffic prioritization is achieved at the packet level by separate Packet Transmission Queues and at the ATM level by the use of specific configurable sets of ATM Traffic Parameters for the connections carrying Control Traffic. The User can configure different sets of Traffic Parameters for the different types of CSI internal connections. An example configuration is shown in FIG. 8 and Table 1 shown below.

TABLE 1

ATM Traffic Parameters configuration example

| | Connection type | Service category | Traffic Parameters configuration example |
|---|---|---|---|
| 1. | SP to CONS connection | VBR | PIR = 10 Mbps, SIR = I Mbps, MBS = 128 cells |
| 2.a | SP-RS connection Cntl | VBR | PIR = 10 Mbps, SIR = I Mbps, MBS = 128 cells |
| 2.b | SP-RS connection: Data | VBR | PIR = 20 Mbps, SIR = 5 Mbps, MBS = 128 cells |
| 2.c | SP-RS: Broadcast (P2MP) | UBR | PIR = 149,760 Mbps |
| 3. | SP—SP, Premium COS for Realm A | VBR | PIR = 149,760 Mbps, SIR = 20 Mbps, MBS = 128 cells |
| 4. | SP—SP, Standard COS for Realm A | UBR | PIR = 149,760 Mbps |
| 5. | SP—SP, Premium COS for Realm B | VBR | PIR = 149,760 Mbps, SIR = 10 Mbps, MBS = 128 cells |
| 6. | SP—SP, Standard COS for Realm B | UBR | PIR = 149,760 Mbps |

In this example, the control connections get high priority with VBR Service Category. The User Data service differentiation in each Realm is achieved through the use of variable bit rate (VBR) for Premium CoS (3, 5) and unspecified bit rate (UBR) for Standard CoS (4, 6). There is also a certain level of service differentiation between Realm A and Realm B through the use of different sustained information rate (SIR) values between the Premium CoS in Realm A (3, SIR=20 Mbps) and realm B (5, SIR=10 Mbps). The Maximum Burst Size (MBS) has to be configured accordingly with the maximum transmission unit (MTU): the MBS has to be large enough to contain the maximum size of packet.

The User can also configure ATM Traffic Parameters on the VCC that connects the Customer equipment to an ISC (PIPE) Si. This ATM VCC Traffic Parameters configuration is not directly linked with the CSI CoS configuration, as these two features have a different scope.

Figure 9:
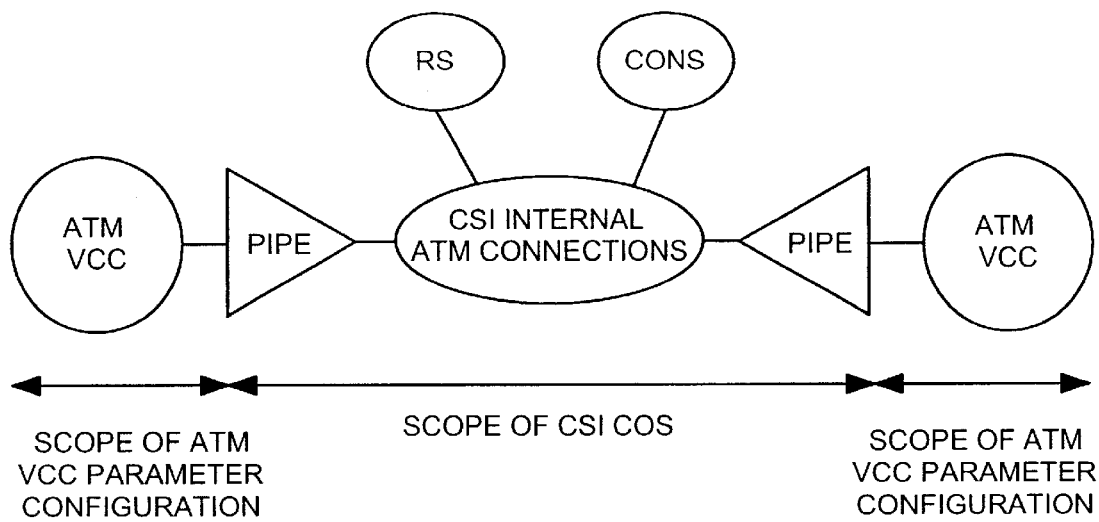
FIG. 9 illustrates the scope of the CSI CoS and the scope of an ATM virtual channel connection (VCC) traffic parameter configuration.
Figure 10:
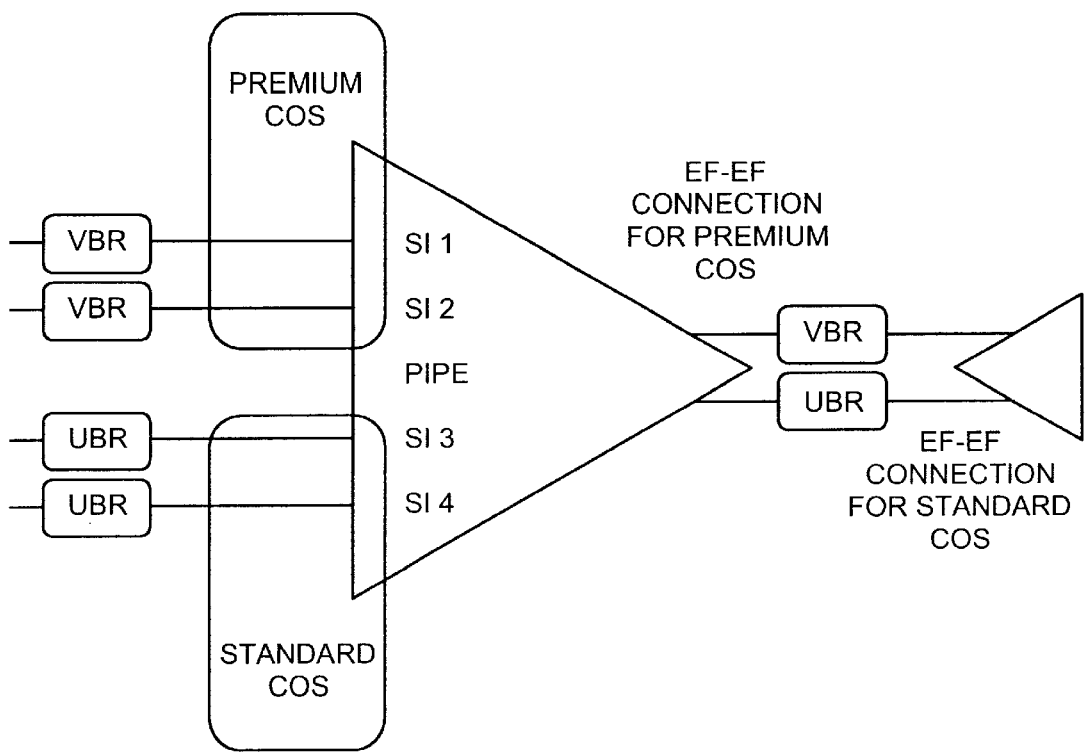
FIG. 10 represents an example VCC ATM traffic parameter configuration at an Internetworking Services Card (ISC) at a Services Interface (SI)

It's possible, however, to use the ATM VCC Traffic Parameters configuration to extend the CSI CoS configuration as shown in example of FIG. 9.

In this example, the CoS configuration on VNets and Sis gives Premium CoS to traffic from or to SI1 and SI2. This Premium CoS is mapped to VBR SP-SP SVCs in the CSI system. The scope of the CSI CoS is extended by the use of the same VBR configuration on VCCs used for SI1 and SI2. The same principle applies to SI3 and SI4 that get Standard CoS and are mapped to UBR service category.

The role of the Packet Classification is to determine the CoS for each packet in the CSI System. The packet Classification is performed on each Packet Receive Interface of the CSI components. The packet classification effectively identifies four different types of traffic: a) High Priority Control Traffic b) Low Priority Control Traffic b) User Data Premium Traffic c) User Data Standard Traffic. However, Low priority Control Traffic and User Data Premium Traffic get the same CoS, as defined in table 2:

TABLE 2

CoS definition

| Type of Traffic | CoS |
|---|---|
| High Priority Control Traffic | High Priority Control Traffic CoS |
| Low Priority Control Traffic | Premium CoS |

TABLE 2-continued

CoS definition

| Type of Traffic | CoS |
|---|---|
| User Data Premium Traffic | |
| User Data Standard Traffic | Standard CoS |

The High priority Control Traffic includes,
ARM and CCP internal protocols,
Routing protocols: RIP, OSPF, BGP. This includes the BME messages containing these types of protocols.
Spanning Tree BPDUs
PPP control protocols: LCP, BCP, IPCP, CHAP
The Low priority Control Traffic includes,
Exceptions messages sent from the SPs to the RS.
ARP messages The Standard CoS vs. Premium CoS classification of User Data Traffic requires explicit configuration at the VNet and/or SI level. The Packet Classification is performed in each packet receive interface. The Packet Classification is similar on the PIPE, Ridge and ATM NIC. Packets received from a SI and forwarded directly to another SP or internally to another SI of the receiving SP get Standard CoS or Premium CoS.

The packet classification is based on the CoS configured at two possible levels from the ISM: VNet CoS and SI CoS.
  VNet CoS configuration.—Each VNet is configured with Standard CoS (default) or Premium CoS. The term VNet refers to a Virtual Subnet or a VLAN in VPN, or to a Subnet for Public Internet case.
  Si COS configuration.—The default CoS configuration on SI is 'VNet based CoS' which means that the packet classification is based on the VNet CoS on this SI. It's also possible to configure a SI with an explicit 'Standard CoS', 'Premium CoS' CoS that overrides the VNet level on this SI.

The general principle as previously discussed is that each flow of traffic gets the highest configured CoS of its source and its destination i.e.:

CoS (packet)=MAX. (Source CoS, Destination CoS)

The Destination CoS is determined as follows:
  If the destination SI is configured with an explicit Standard CoS or Premium CoS, the destination CoS is equal to the CoS configuration of this SI.

If the destination SI is configured with the default 'VNet based CoS', the destination CoS is equal to the CoS configuration of the destination VNet.

The Source CoS is determined as follows:

If the source SI is configured with an explicit Standard CoS or Premium CoS, the Source CoS is equal to the CoS configuration of this source SI.

If the source SI is configured with the default 'VNet based CoS', the Source CoS is equal to the CoS configuration of the source Vnet, with the restriction mentioned in point 2 below in relation to IP routed packets in the case of multinetting.

The following restrictions apply to IP routed traffic:

1. There is no CoS differentiation between different Subnets behind a router. For traffic received from (or transmitted to) IP Hosts behind a router, the source (or Destination) VNet that is taken in account is the VNet where the router is attached.

2. If multiple subnets are configured on a SI, and the subnets do not have the same CoS (ie. some are Standard, and others are Premium), then the Premium CoS will be used as the source CoS for all packets arriving on the service interface. This restriction always applies to Public Internet and also applies to VPN Realms on the PIPE only. It does not apply to the Ridge in VPN Realms.

As discussed, Routing protocols get High Priority Control Traffic CoS. User Data packets falling into one of the exception cases and ARP Messages get Low Priority Control Traffic (Premium CoS). Every other type of packet sent to the RS gets Standard CoS or Premium CoS. Broadcast or Multicast packets classification is based on the Source CoS which is determined as described above.

Packets received from another SP on a SP—SP SVC can get Standard CoS or Premium CoS. The packet classification is based on the CoS of the SP—SP SVC where the packet is received and on the destination CoS.

CoS (packet)=MAX(CoS(Receiving SVC), CoS (destination))

Every ARM and CCP protocol packet received on an SP-CONS SVC or on an SP-RS SVC gets 'Control Traffic' CoS. This is only an internal SP classification as this type of packet is not sent to any SI.

Packets received from the RS with BME encapsulation are classified as follows:

Routing protocols get High priority Control Traffic CoS.

ARP messages get Premium CoS (Low priority Control Traffic).

Any other type of packet gets User Data Standard CoS or Premium CoS, depending on the Destination VNet CoS.

The Control packets that are not really received and forwarded by the SP but generated by the SP itself, can get High Priority Control Traffic or Premium CoS (Low Priority Control Traffic). STP BPDUs sent to the SI and to the RS get High priority Control Traffic CoS. ARM and CCP messages get High priority Control Traffic CoS. PPP control protocols packets sent to the SI get High Priority Control Traffic CoS. ARP messages sent by the SP on the SIs get Premium CoS (Low Priority Control Traffic). Table 3 below summarizes the distribution of the User Data Packet Classification on the CSI components.

TABLE 3

Packet Classification on the CSI components

| | |
|---|---|
| NMS | Configuration of the CoS for each VNet and SI. |
| RS | Distribution of the CoS configuration to the Forwarders. Although the CoS is configured at the VNet/S1 level on the NMS, it is also stored at the Cache Entry level in SP-RS Cache management messages and SP Forwarding table. This ensures evolutivity to better granularity. The RS gets from the VNM the CoS configured with each VNet and SIs of its own domain and uses this information to determine the CoS to assign to each Cache Entry downloaded to the SPs. Multiple RSs in a single Realm exchange CoS information. |
| SP | Support of the CoS parameter in Forwarding Tables Entries. |

The role of the Packet Level Management function is to provide inter-realm fairness and to prioritize traffic accordingly with the result of Packet Classification.

Three separate transmission Queues are used on each Ridge SI, a.k.a. Ethernet Port. Table 4 defines the characteristics of these three Queues and the queue priority mapping of each CoS.

TABLE 4

Ridge Ethernet Port Queues

| Queue Priority | Type of Traffic | Queue Size |
|---|---|---|
| High | High Priority Control Traffic | 16 |
| Medium | Premium CoS | 80 |
| Low | Standard CoS | 80 |

A simple tail of Queue discard is performed for each Queue: the arriving packet is discarded when the Queue is full.

The Queue servicing across the three Queues of a given port is defined as follows: The High Priority Control Traffic Queue needs to be completely exhausted prior to the two other queues being processed. A Weighted Round Robin queuing algorithm is used across these two queues. In case of contention, the Premium CoS Queue will get 80% of the available resource and the Standard CoS 20%. These values are not configurable (hard coded) and define an average approximation: the Queue servicing algorithm is based on a packet count regardless to the packet lengths. When a queue does not use, fully, its share of bandwidth, the other queue can use the remaining part.

Note that the 20–80% ratio is based on the aggregate bandwidth of each CoS without any concept of multiple traffic flows in each CoS. This can lead to unexpected situations with numerous Premium CoS traffic flows and a few Standard CoS traffic flows. For example with 8 traffic flows (source host, destination host) falling in Premium CoS and one (source host, destination host) falling into Standard CoS, the single Standard CoS traffic flow will get two times more bandwidth than each of the Premium CoS traffic flows.

There is no Queue servicing algorithm across the different SIs. The group of Queues of each SI is simply served when the Ethernet port is ready for transmission.

Figure 11:
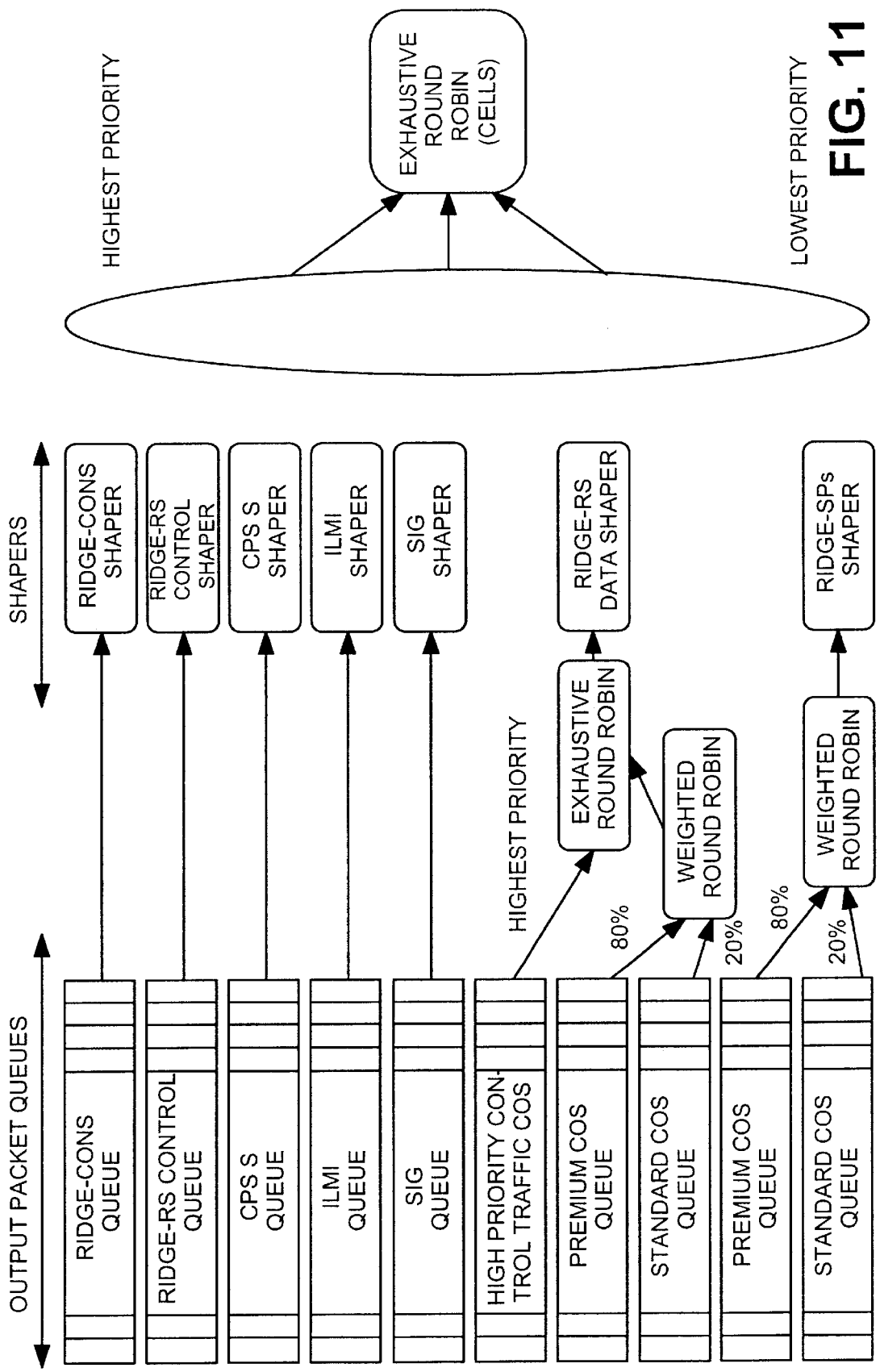
FIG. 11 illustrates packet output queues and shapers used on a Ridge ATM port.

FIG. 11 defines the packet output Queues and the shapers used on the Ridge ATM port. Three different Packet Queues are used for the Data connection to RS. These three Queues are used in the same way as the Ethernet port Queues.

All Premium CoS SP—SP SVCs and Premium CoS SVCs share the same shaper, with a separate packet Queue for each of the two Classes of Service. The principle of the Weighted Round Robin between these two packet Queues is identical to the Ethernet Port case. A simple tail of Queue discard is performed for each Output Packet Queue: the arriving packet is discarded when the Queue is full.

Table 5 below defines the Packet Queue lengths and the shaping PIR values. There is no packet level shaping, no SIR and MBS control.

TABLE 5

Ridge ATM Port Queues

| Transmission Queue | Queue Size | Connection(s) | PIR |
| --- | --- | --- | --- |
| SP-Cons | 8 | SP to CONS CONFIG | Configurable by NMTI |
| SP-RS Control | 8 | SP-RS Control | Download from CONS |
| CPSS | 8 | CPSS PVC | 64 Kbps |
| ILMI | 8 | ILMI PVC | 1587 Kbps |
| SIG | 8 | SIG PVC | 74 Kbps |
| High Priority Control Traffic COS to RS Data | 16 | SP to RS DATA | Download from CONS |
| Premium COS to RS Data | 16 | | |
| Standard COS to RS Data | 16 | | |
| Premium COS SP—SP | 64 | All Premium COS SP—SP SVCs | Configurable by NMTI(1) |
| Standard COS SP—SP | 64 | All Standard COS SP—SP SVCs | |

(1) Note that the Ridge has only one shaper for all SP—SP SVCs of each COS and cannot shape each SVC at the rate indicated by TP downloaded from CONS.

The PIPE has only one external physical connection, the ATM interface onto the ATM switch (e.g. Newbridge 36170) backplane. Packet level output scheduling and queue management on the PIPE provides for fair sharing of this single interface across a large set of virtual interfaces of various types. The ATM layer on the PIPE supports per-VC queuing that provides the link level path and the basis of the output control for the active set of virtual network interfaces. These virtual interfaces include: Service Interfaces; Transport Interfaces; and Control Interfaces.

At the packet level the PIPE supports bi-level hierarchical class-based queuing, providing fair round robin between realms (inter-realm scheduling) and multi-level weighted round robin within each realm (intra-realm scheduling). Both of these queue schemes achieve work conservation in conjunction with the required resource sharing. Within the intra-realm weighted round robin fairness of weighting is assured on the queues within each virtual interface and across the set of interfaces in the realm.

The inter-realm queue scheduling is derived from the carry-over round robin (CORR) scheme. The purpose of inter-realm scheduling is to ensure that, during periods of output congestion, each active realm on a PIPE is provided with a fair share of the backplane interface. There are no directly configurable controls on inter-realm scheduling.

The intra-realm scheduling provides the packet priority management for the various virtual network interfaces using the result of the Packet Classification function. Three separate queues are provided above each virtual network interface:

1) ASAP—for high priority control traffic;
2) Hi—for low priority control traffic and high priority user traffic; and
3) Std—for standard user traffic.

Figure 12:
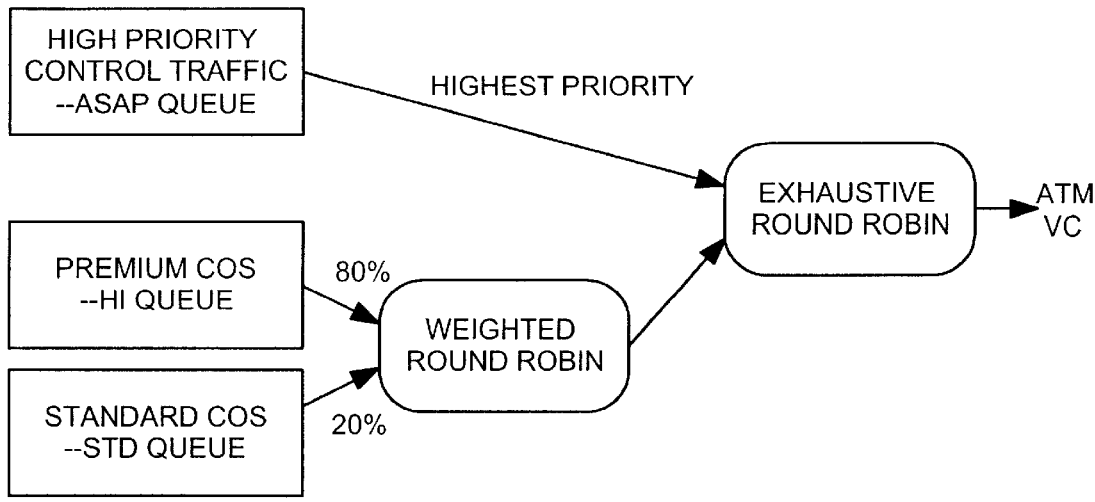
FIG. 12 shows an ISC queuing model for a single VC virtual interface.
Figure 13:
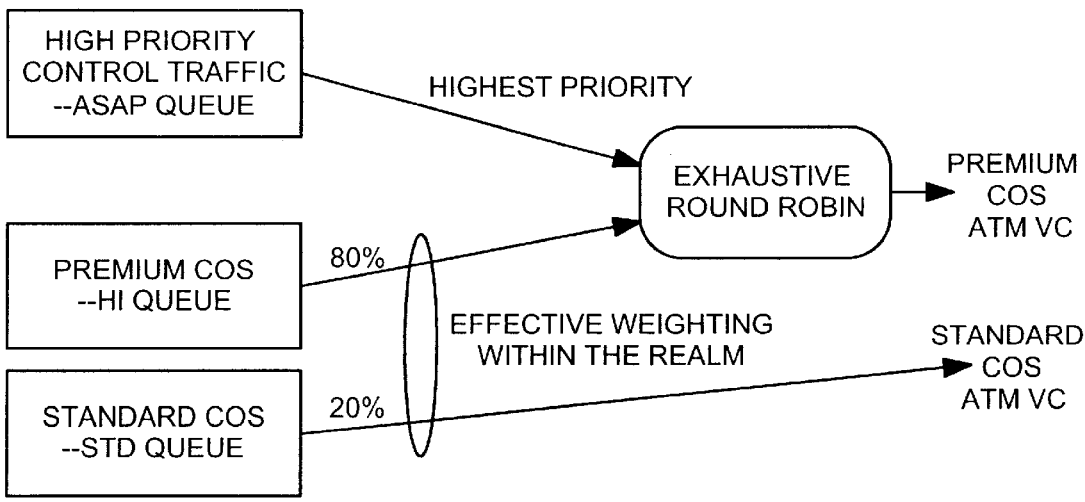
FIG. 13 shows an ISC queuing model for dual VC virtual interfaces.

The ASAP queues are scheduled immediately with an exhaustive service up to the current bandwidth available within the realm. The Hi and Std queues are serviced by a weighted round robin scheduler which is applied evenly across all interfaces within the realm. Service Interfaces and Control Interfaces have a single VC as the link level ATM mapping for the entire virtual network interface. Some Transport Interfaces have a single VC as the link level ATM mapping for the entire virtual network interface. The queue servicing for virtual interfaces above a single VC is shown in FIG. 12.

Transport Interfaces are typically configured to be setup with two ATM VCs in the ATM link level mapping. When this is the case the "Premium COS" VC is mapped below the ASAP and Hi queues and the "Standard COS" VC is mapped below the Std queue. The queue servicing for virtual interfaces above a pair of VCs is shown in FIG. 3. When the Transport Interface has only one SVC, either because of configuration or fallback, the interface reverts to the single VC Virtual Interface model.

The RS uses a single FIFO output packet queue for ATM transmission. The queue management is tail drop.

On ATM transmission, the ATM NIC uses two separate packet output queues. One queue for traffic to the RS and CONS, which gets highest priority, and one queue for traffic to other SPs. The queue management is tail drop.

Next the ATM Level Traffic management function will be described. A separate SP—SP SVC can be setup for each CoS and each Realm (VPN Realm or Public Internet Realm). One SVC for Standard CoS and one SVC for Premium CoS. The differentiation between Standard CoS and Better Effort SVCs is achieved with different Traffic Parameters. Only one SP—SP is established in realms where the Traffic Parameters configuration is the same for Standard CoS SP—SP SVCs and Premium CoS SP—SP SVCs.

The general rule is that when an SP sends a packet to another SP, it chooses the SVC corresponding to the CoS of the packet. However, as shown in Table 6, in some temporary or downgraded situations where both SVCs are not established, a single SVC is used for both Standard CoS and Premium CoS User Data packets.

The rules for this behaviour when the SVC's are up, down, or currently being setup are also described in this table.

TABLE 6

Packet transmission based on SVC state

| SVC state | | Actions on queued and new packets with a COS of | |
| --- | --- | --- | --- |
| Standard SVC | Premium SVC | Standard | Premium |
| Down | Down | Discard | Discard |
| Down | Setup | Discard | Queue |
| Down | Up | Discard | Send |
| Setup | Down | Queue | Queue on Standard SVC |
| Setup | Setup | Queue | Queue |
| Setup | Up | Queue | Send |
| Up | Down | Send | Send on Standard SVC |
| Up | Setup | Send | Queue |
| Up | Up | Send | Send |

In a VPN Realm, an SP sets up an SVC to a remote SP ATM address for a particular CoS when it has one packet to send to this (ATM address, CoS). The packet that triggers the set-up and subsequent packets for the same (ATM address, CoS) are buffered during the SVC establishment. In Public Internet (PI) Realm, an SP sets up an SVC to a remote SP ATM address for a particular CoS as soon as it has at least one forwarding entry pointing to this (ATM address, CoS).

A part of the CoS function is the ability given to configure specific Traffic Parameters for the different types of SVCs and different Realms. This allows to configure the degree of priority to offer to the different CoSs and also to offer a better service to certain Realms.

Table 7 shown below summarizes the different sets of Traffic Parameters that can be configured separately.

TABLE 7

Configurable sets of Traffic Parameters

| Scope | Connection type | Default Service Category | Highest Recommended Service Category |
|---|---|---|---|
| Per SP | SP to CONS | UBR | VBR |
| Global to CSI | SP-RS. Data | UBR | VBR |
| System | SP-RS. Control. | UBR | VBR |
|  | SP-RS Broadcast (P2MP) | UBR | VBR |
| Per Realm (Public Internet or VPN Realm) | -RS—RS (NHRP + Routing) | UBR | VBR |
|  | -SP—SP Standard COS | UBR | UBR |
|  | -SP—SP Premium COS | UBR | VBR |
| Per PIPE SI | -SI (PVC or SPVC) | N/A |  |

A SI carrying Standard CoS User Data should be configured with UBR. A SI carrying Premium CoS User Data should be configured with nrtVBR.

When any service category but UBR is chosen for connections to or from a CONS, a RS, and an SP which does not shape traffic, it is desirable to use a Multiple Traffic Shaping Module (MTSM) on the cell relay interface to the device. In this manner, traffic guarantees can be maintained.

The scope indicated in this table applies to a particular embodiment of a CSI system but CSI internal protocols are designed so that finer granularity of Traffic Parameters configuration can be offered.

The Traffic Parameters of CSI internal SVCs are defined in conformance with ATM Forum UNI 3.1 specifications. Table 8 below defines the possible combinations of Service Category and Traffic Parameters.

TABLE 8

SVCs Traffic Parameters definition

| Service Category and Policing option | PIR | SIR | MBS | Signaled Traffic parameters (2) |
|---|---|---|---|---|
| CBR (1) | ✓ |  |  | PCR_0 + 1. |
| VBR_O, discard (3) | ✓ | ✓ | ✓ | PCR_0 + 1. SCR_0 MBS_0. |
| VBR_0, tagging (3) | ✓ | ✓ | ✓ | PCR_0 + 1. SCR_0 MBS_0. Tagging requested. |
| VBR_0 + 1 (4) | ✓ | ✓ | ✓ | PCR_0 + 1. SCR_0 + 1 MBS_0 + 1 |
| UBR | ✓ |  |  | PCR_0 + 1 |

Note (1). It is strongly recommended to never use the CBR service category as there are stringent delay requirements for this service category necessitating small queues within the switching components.

Note (2). Equal values are always signaled for backward and forward directions except for P2MP connections.

Note (3). With VBR-O, the SCR and M13S parameters apply only to the cells with CLP bit set to zero. The 'discard' or 'tagging' option indicates if non compliant cells should be discarded or tagged with CLP=1. This 'discard' vs. 'tag' option is not significant when policing is disabled on the ATM switch.

Note (4) With VBR-0+1, the SCR and MBS parameters apply to every cell, regardless of the CLP bit value.

The CLP bit is always set to 0 in traffic sent by the SPs.
Table 9 below defines the valid values for each parameter.

TABLE 9

SVCs Traffic Parameters valid values

|  | PIR | SIR | MBS |
|---|---|---|---|
| Minimum value | 64 Kbps | 64 Kbps | 1 cell |
| Maximum value | 149,760 Kbps | PIR | See (1) |
| Default for CBR | 10 Mbps | n/a | n/a |
| Default for VBR | 149,760 Kbps | 10 Mbps | 32 Cells (1528 bytes Ethernet frame) |
| Default for UBR | 149,760 Kbps | n/a | n/a |

Available Service Categories are UBR, nrtVBR, rtVBR, CBR. It is strongly recommended to never use the CBR service category as there are stringent delay requirements for this service category necessitating small queues within the switching components. rtVBR will exhibit similar behavior, although not to the same degree. The end-to-end characteristics are not guaranteed through the PIPE Card, although they are guaranteed on a hop-by-hop basis excluding the PIPE Cards.

The 36170 Traffic Management features, including Cells prioritization based on Service category, CAC and UPC, allow the User to actually control the resources allocation in the ATM fabric through the ATM Traffic.

By choosing a Service Category for a type of connection, the User implicitly chooses a Cell switching priority and target Cell Loss Ratio.

TABLE 10

Priority of the different Service categories

| Service category | Cell Switching Priority | Target CLR_0 (36170) |
|---|---|---|
| CBR | High | 1.7E−10 |
| rtVBR | High | 1.7E−10 |
| nrtVBR or VBR | Medium | 1.0E−7 |
| UBR | Low | No Target |

Traffic Parameters for SVCs differ somewhat from those for PVCs. SPVCs form a hybrid.

The major difference between PVCs, SVCs and SPVCs is in the configuration of policing (UPC). Policing is configurable on per-connection basis for PVCs, is never on for SPVCs, and is configurable on a per-subscriber basis for SVCs. It is suggested that policing be always disabled for Service Points due to the lack of good traffic shaping. The PIPE card has policing inherently always disabled. The service profile for subscribers on Ridge, ACC Tigris or NIC attached ATM interfaces must be configured to disable policing.

It is highly desirable to attach Multiple Traffic Shaping Modules (MTSM) daughter cards to cell relay cards within the 36170.

Every connection through the cell relay card will have its traffic shaped to conform with the configured or signaled traffic descriptor. To do this for every cell relay card within the system is overkill. The MTSMs should be placed in locations within the network where a high degree of contention exists between customers of the network. This will ensure fairness. These are locations such as the OC3 connections to a cell switch (e.g. Newbridge CS 3000) concentrating traffic from Ridges, OC3 connections to Route Servers, long-haul Transport Interfaces, and connections to the core of the Public Internet.

Selection of traffic parameters for frame relay service interfaces follows the same model as ATM traffic descriptors with different terms which mean slightly different terms. There is a defined mapping between ATM's PIR, CDVT, SIR, and MBS and FR's CIR, Bc, and Be.

When configuring a frame relay connection's traffic descriptor, there is the option of configuring a quality of service (QoS). These have the values "real-time", "low-delay", "committed-throughput", and "best-effort". These roughly map onto and cause the ATM Service Category to default to rtVBR, nrtVBR, ABR, and UBR respectively. After the FR QoS has been configured, the ATM service category may be changed. This should be done with consideration given to the traffic guarantees that would result.

SI carrying Standard CoS User Data should be configured with "best-effort" FR QoS.

SI carrying Premium CoS User Data should be configured with "low-delay" FR QoS.

While particular embodiments and aspects of the invention have been described and illustrated it will be apparent to one skilled in the art that numerous alternatives and variations can be implemented. It is to be understood, however, that such alternatives and variations will be considered, to the extent possible, to fall within the scope of the invention as defined by the appended claims.

What is claimed is:

1. A system for providing users of a digital network with differentiated classes of service for data packets through a virtual network comprising:
    packet classification means to assign a class of service to received data packets, the class of service being assigned at a virtual network level and at a service interface level, the service interface level being inside the virtual network level;
    and traffic management means to prioritize said data packets in output queues, said data packets being prioritized in said output queues according to the assigned class of service;
    wherein said class of service assigned at the service interface level overrides the class of service assigned at the virtual network level.

2. The system as defined in claim 1 wherein said packet classification means is included in an internetworking services manager associated with a system network manager.

3. The system as defined in claim 1 wherein said digital network is divided into multiple instances of virtual private network (VPN) services over a plurality of service interfaces.

4. The system as defined in claim 3 wherein said VPN services contain one or more virtual local area networks (VLANs).

5. The system as defined in claim 3 wherein said VPN services contain one or more virtual subnets.

6. The system as defined in claim 1 wherein said data packets include user data.

7. The system as defined in claim 6 wherein said user data is differentiated into standard class of service and premium class of service.

8. The system as defined in claim 1 wherein said data packets include control traffic.

9. A system as defined in claim 8 wherein said control traffic is given priority over user data.

10. The system as defined in claim 1 wherein the assigned class of service is the better of the class of service of a source and a destination of the data packets.

11. The system as defined in claim 1 wherein the class of service at the service interface level defaults to the class of service at the virtual network level if no class of service has been assigned at the service interface level.

12. The system as defined in claim 1 wherein the traffic management means includes packet level traffic management and ATM level traffic management.

13. The system as defined as defined in claim 1 for providing users of a digital network with differentiated classes of service for data packets through multiple virtual networks.

14. A method of delivering differentiated service to users of a digital network, the method comprising:
    assigning a class of service to received data packets, the class of service being assigned at a virtual network and at a service interface level, the service interface level being inside the virtual network level;
    prioritizing said data packets into output queues, said data packets being prioritized in said output queues according to the assigned class of service;
    and transporting the packets through the network in accordance with the prioritization;
    wherein said class of service assigned at the service assigned at the service interface level overrides the class of service assigned at the virtual network level.

15. The method as defined in claim 14 wherein said data packets include user data which is classified as either standard class of service or premium class of service.

16. The method as defined in claim 15 wherein said data packets include control data which is classified with a higher priority class of service than said user data.

17. The method as defined in claim 14 wherein the assigned class of service is the better of the class of service at a source and a destination of the data packets.

18. The method as defined in claim 14 wherein the class of service at the service interface level defaults to the class of service at the virtual network level if no class of service has been assigned at the service interface level.

19. A system for providing differentiated classes of service for data packets traversing a virtual network in a multi-protocol over ATM (MPOA) network, said system comprising:
    packet classification means to determine, from each received data packet, a class of service to be assigned to said data packet and to assign to said data packet a class of service at a virtual network level and at a service interface level, wherein the service interface level is within the virtual network level;
    packet level traffic management means to prioritize data packets in separate packet transmission queues according to assigned class of service;
    and ATM level traffic management means to prioritize ATM cells according to the assigned class of service and to configure ATM traffic parameters;
    wherein said class of service assigned to the service interface level overrides the class of service assigned to the virtual network level.

* * * * *